(12) United States Patent
Li

(10) Patent No.: US 7,022,646 B2
(45) Date of Patent: Apr. 4, 2006

(54) LAYERED CATALYST COMPOSITE

(75) Inventor: Yuejin Li, Edison, NJ (US)

(73) Assignee: Engelhard Corporation, Iselin, NJ (US)

(*) Notice: Subject to any disclaimer, the term of this patent is extended or adjusted under 35 U.S.C. 154(b) by 224 days.

(21) Appl. No.: 10/355,779

(22) Filed: Jan. 31, 2003

(65) Prior Publication Data
US 2004/0151645 A1 Aug. 5, 2004

(51) Int. Cl.
B01J 23/42 (2006.01)

(52) U.S. Cl. .................................................. 502/339
(58) Field of Classification Search ................. 502/326, 502/328, 330, 339
See application file for complete search history.

(56) References Cited

U.S. PATENT DOCUMENTS

| 4,868,148 A | 9/1989 | Henk et al. ................. 502/303 |
| 5,212,142 A | 5/1993 | Dettling ..................... 502/304 |
| 5,597,771 A | 1/1997 | Hu et al. .................... 502/304 |
| 5,948,723 A | 9/1999 | Sung .......................... 502/303 |
| 5,981,427 A | 11/1999 | Sung et al. ................. 502/325 |
| 5,989,507 A | 11/1999 | Sung et al. ................. 423/213.5 |
| 6,025,297 A | 2/2000 | Ogura et al. ................ 502/300 |
| 6,461,579 B1 * | 10/2002 | Hachisuka et al. ......... 423/213.5 |
| 6,677,264 B1 * | 1/2004 | Klein et al. .................. 502/74 |
| 6,764,665 B1 * | 7/2004 | Deeba et al. ............... 423/239.1 |

FOREIGN PATENT DOCUMENTS

| EP | 0 705 134 | 4/1996 |
| EP | 0 992 276 A1 | 4/2000 |
| EP | 0 992 276 A1 | 12/2000 |
| EP | 1 080 783 A2 | 7/2001 |
| EP | 1 066 874 A1 | 10/2001 |
| FR | 2 799 665 | 4/2001 |
| WO | WO 95/35152 | 12/1995 |

* cited by examiner

Primary Examiner—Edward M. Johnson
(74) Attorney, Agent, or Firm—Richard A. Negin

(57) ABSTRACT

A layered catalyst composite for controlling vehicular exhaust emissions is disclosed. The composite comprises a substrate such as cordierite, at least one bottom layer deposited on the substrate containing a precious metal component such as platinum and at least one $NO_x$ storage component present in the amount of about 0.3 to about 1.5 $g/in^3$, and at least one top layer deposited on the bottom layer containing a precious metal component such as platinum and at least one $NO_x$ storage component present in the amount of about 0.0 to less than about 0.3 $g/in^3$.

35 Claims, 2 Drawing Sheets

LAYERED CATALYST COMPOSITE

FIELD OF THE INVENTION

The present invention relates to a layered catalyst composite useful for the control of vehicular exhaust emissions. The layered catalyst composites are especially useful for reducing the levels of hydrocarbon, carbon monoxide and nitrogen oxides present in the exhaust gas stream discharged from the exhaust manifold of a vehicular engine, which operates under alternating periods of lean and stoichiometric or rich conditions. Further, the layered catalyst composites of the invention exhibit outstanding thermal stability and ability to remove sulfur compounds deposited on the catalyst under moderate conditions and the ability to remove sulfur compounds deposited on the catalyst under moderate conditions.

RELATED ART

Layered catalyst composites are known in the prior art. Such catalysts have utility in a number of fields including the treatment of exhaust gas streams from internal combustion engines, such as automobile, truck and other gasoline-fueled engines.

U.S. Pat. No. 4,134,860 relates to the manufacture of catalyst structures. The catalyst composition can contain platinum group metals, base metals, rare earth metals and refractory, such as alumina support. The composition can be deposited on a relatively inert carrier such as a honeycomb.

U.S. Pat. No. 4,438,219 discloses an alumina-supported catalyst for use on a substrate. The catalyst is stable at high temperatures. The stabilizing material may be one of several compounds including those derived from barium, silicon, rare earth metals, alkali and alkaline earth metals, boron, thorium, hafnium and zirconium. Of the stabilizing materials barium oxide, silicon dioxide and rare earth oxides, which include lanthanum, cerium, praseodymium, neodymium, and others, are indicated to be preferred. It is disclosed that contacting them with some calcined alumina film permits the calcined alumina film to retain a high surface area at higher temperatures.

Typical prior art layered catalyst composites will comprise one or more platinum group metals (e.g., platinum palladium rhodium, rhenium and iridium) disposed on a high surface area, refractory metal oxide support, e.g., a high surface area alumina coating and will also contain one or more $NO_x$ trapping components, e.g., barium or potassium. The support is carried on a suitable substrate such as a monolithic carrier comprising a refractory ceramic or metal honeycomb structure, or refractory particles such as spheres or short, extruded segments of a suitable refractory material. Examples of such prior art include EP 1 080 783 A2 and EP 1 066 874 A1.

U.S. Pat. No. 4,134,860 relates to the manufacture of catalyst structures. The catalyst composition can contain platinum group metals, base metals, rare earth metals and refractory, such as alumina support. The composition can be deposited on a relatively inert carrier such as a honeycomb.

$SO_x$ tolerant $NO_x$ trap catalysts are also known. For example, see my earlier U.S. Pat. No. 6,419,890 B1 that discloses $SO_x$ tolerant $NO_x$ trap catalyst composites comprising a platinum component, a support, a $NO_x$ sorbent component, and a spinel material prepared by calcining an anionic clay material.

U.S. Pat. No. 4,780,447 discloses a catalyst, which is capable of controlling HC, CO and $NO_x$ as well as $H_2S$ in emissions from the tailpipe of catalytic converter-equipped automobiles. The use of the oxides of nickel and/or iron is disclosed as a hydrogen sulfide gettering-type of compound.

OBJECT OF THE INVENTION

It is an object of this invention to provide a catalyst that catalyzes the reduction of nitrogen oxides to nitrogen with high efficiency and thermal durability and is able to remove sulfur compounds deposited on the catalyst under moderate conditions in respect to a vehicular engine which operates under alternating periods of lean and stoichiometric or rich conditions.

Thermal stability is an essential requirement of a $NO_x$ trap catalyst. Thermal durability is required not only because the catalyst composite is exposed to a high temperature environment during normal engine operations, but also because the $NO_x$ trap becomes poisoned due to the presence of sulfur in the fuel and it is necessary to refresh the $NO_x$ trap component by repeated desulfation operations.

Desulfation of the $NO_x$ trap normally requires a rich or rich/lean cyclic environment at high temperatures, e.g., >600° C. As a consequence of the desulfation operations, the catalyst will most likely be thermally deactivated Accordingly, it is an object of the invention to provide a layered catalyst composite containing a $NO_x$ storage component that will be thermally stable after repeated high temperature cyclic operations and further that will be able to eliminate sulfur by desulfation operations.

SUMMARY OF THE INVENTION

The present invention relates to a layered catalyst composite comprising at least two layers upon a substrate (also referred to herein as a carrier). The choice of the substrate and the composition of each layer, including optional components is set forth in detail below. The bottom layer (also referred to herein as the first layer) is deposited on the carrier. The top layer (also referred to herein as the second layer) is deposited on the bottom layer.

Additional bottom and top layers may also be present provided that the overall composition of the layered catalyst composite is such that the capability of the precious metal component(s) for the oxidation of hydrocarbons and carbon monoxide to carbon dioxide is not adversely affected by the presence of the $NO_x$ storage component(s) required for the reduction of nitrogen oxides to nitrogen.

DETAILED DESCRIPTION OF THE INVENTION

Figure 1:
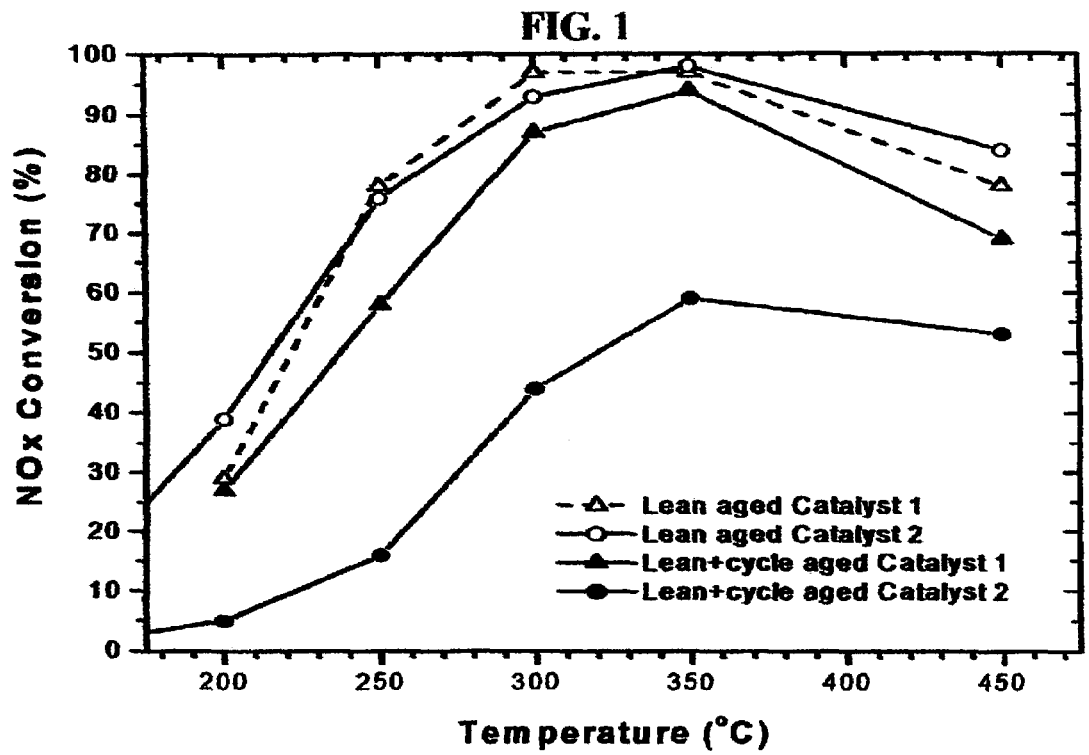
FIG. 1 is a graph that illustrates the thermal stability of Catalysts 1 and 2.

The layered catalyst composite of the invention useful for controlling vehicular exhaust emissions comprises:

(a) a substrate;

(b) at least one bottom layer having a bottom surface and a top surface wherein the bottom surface is adjacent to, and in contact with, the substrate, said bottom layer comprising a support upon which is deposited: (i) at least one precious metal and (ii) at least one $NO_x$ storage component present in the amount of about 0.3 to about 1.5 $g/in^3$; and (c) at least one top layer having a bottom surface and a top surface wherein the bottom surface is adjacent to, and in contact with, the top surface of the bottom layer, said top layer comprising a support upon which is deposited (i) at least one precious metal, and (ii) at least one $NO_x$ storage component present in the amount of 0.0 to less than about 0.3 $g/in^3$.

The substrate may be any of those materials typically used for preparing catalysts and will preferably comprise a ceramic or metal honeycomb structure. Any suitable substrate may be employed, such as a monolithic carrier of the type having fine, parallel gas flow passages extending therethrough from an inlet or an outlet face of the carrier, such that passages are open to fluid flow therethrough. The passages, which are essentially straight paths from their fluid inlet to their fluid outlet, are defined by walls on which the catalytic material is coated as a washcoat so that the gases flowing through the passages contact the catalytic material. The flow passages of the monolithic carrier are thin-walled channels, which can be of any suitable cross-sectional shape and size such as trapezoidal, rectangular, square, sinusoidal, hexagonal, oval, circular, etc. Such structures may contain from about 60 to about 300 or more gas inlet openings (i.e., cells) per square inch of cross section.

The ceramic carrier may be made of any suitable refractory material, e.g., cordierite, cordierite-α alumina, silicon nitride, zircon mullite, spodumene, alumina-silica magnesia, zircon silicate, sillimanite, a magnesium silicate, zircon, petalite, α-alumina, an aluminosilicate and the like.

The substrates useful for the layered catalyst composites of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10–25 wt. % of chromium, 3–8 wt. % of aluminum and up to 20 wt. % of nickel. The alloys may also contain small or trace amounts of one or more other metals such as manganese, copper, vanadium, titanium and the like. The surface or the metal carriers may be oxidized at high temperatures, e.g., 1000° C. and higher, to improve the corrosion resistance of the alloy by forming an oxide layer on the surface the carrier. Such high temperature-induced oxidation may enhance the adherence of the refractory metal oxide support and catalytically promoting metal components to the carrier.

The support for the bottom layer as well as for the top layer comprises a high surface area refractory metal oxide such as alumina, titania, zirconia; mixtures of alumina with one or more of titania, zirconia and ceria; ceria coated on alumina or titania coated on alumina. The refractory metal oxide may consist of or contain a mixed oxide such as silica-alumina, aluminosilicates which may be amorphous or crystalline, alumina-zirconia, alumina-chromia, alumina-ceria and the like. The preferred refractory metal oxides are gamma alumina, ceria coated on alumina and titania coated on alumina.

Typically, the refractory metal oxide will have a specific surface area of about 60 to about 300 $m^2/g$. The support for both the bottom and top layers will be present in an amount of about 0.5 to about 3.0 $g/in^3$. It should be noted that the support chosen for the bottom layer need not be, but is conveniently, the same as that chosen for the top layer. Moreover, the amount of the support in the bottom layer need not be the same as that in the top layer, so long as the amounts of the supports in the bottom and top layers are within the foregoing range.

Deposited on the support for both the bottom and the top layers will be one or more precious metal components, e.g., platinum, palladium, rhodium and mixtures thereof, preferably, the precious metal component comprises platinum. The amount of loading of the precious metal component for both the bottom and the top layers will be in the range of about 10 to about 120 $g/ft^3$. Here again, the precious metal chosen for the bottom layer need not be, but is conveniently, the same as that chosen for the top layer. Moreover, the amount of the precious metal component in the bottom layer need not be the same as that in the top layer, so long as the amounts of the precious metal components in the bottom and top layers are within the foregoing range.

Desirably, both the bottom layer as well as the top layer further comprises a transition metal component or a rare earth metal component or mixtures of one or more transition metal components and/or one or more rare earth metal components. Suitable transition metals include zirconium, cerium, manganese, iron and titanium. Suitable rare earth metals include lanthanum, praseodymium, yttrium and zirconium. If used in either layer, the transition metal component is typically present in an amount of about 0.01 to about 0.5 $g/in^3$.

For the purposes of the present invention, the bottom layer must also contain at least one $NO_x$ storage component, i.e., a $NO_x$ trap, in the amount of about 0.3 to about 1.5 $g/in^3$. A suitable $NO_x$ storage component comprises a basic oxygenated compound of an alkali or alkaline earth metal; the alkali metal may be lithium, sodium, potassium or cesium, and the alkaline earth metal may be magnesium, calcium, strontium or barium. The preferred alkali metal comprises potassium, while the preferred alkaline earth metal comprises barium.

Although the supports, precious metal components, $NO_x$ storage components and optional transition metal/rare earth metal components and amounts thereof may be the same or different for the bottom and the top layers, it is essential that the $NO_x$ storage component in the top layer be present in the amount of 0.0 to less than about 0.3 $g/in^3$. It has been unexpectedly found that amounts of the $NO_x$ storage component in the top layer in amounts of about 0.3 $g/in^3$ or greater are not only unnecessary for the reduction of nitrogen oxides to nitrogen, but such excess amounts have a pronounced deleterious effect on the capability of the precious metal components to catalyze the oxidation of hydrocarbons and carbon monoxide to carbon dioxide.

The layered catalyst composite of the present invention may be readily prepared by processes well known in the prior art. A representative process is set forth below.

The catalyst composite can be readily prepared in layers on a monolithic carrier. For the bottom layer, finely divided particles of a high surface area refractory metal oxide such as gamma alumina are slurried in an appropriate vehicle, e.g., water. The carrier may then be dipped one or more times in such slurry or the slurry may be coated on the carrier such that there will be deposited on the carrier the desired loading of the metal oxide, e.g., about 0.5 to about 3.0 g/in$^3$. Components such as the precious metals, transition metal oxides, stabilizers, promoters and the $NO_x$ storage component may be incorporated in the slurry as a mixture of water soluble or water-dispersible compounds or complexes. Thereafter the coated carrier is calcined by heating, e.g., at 400–600° C. for 1–3 hours.

Typically, the precious metal component, e.g., platinum component, is utilized in the form of a compound or complex to achieve dispersion of the component on the refractory metal oxide support, e.g., activated alumina. For the purposes of the present invention, the term "platinum component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the platinum-group metals are preferred. For example, suitable compounds are chloroplatinic acid, amine-solubilized platinum hydroxide, palladium nitrate or palladium chloride, rhodium chloride, rhodium nitrate, hexamine rhodium chloride, etc. During the calcination step, or at least during the initial phase of use of the composite, such compounds are converted into a catalytically active form of the metal or a compound thereof.

A preferred method of preparing the bottom layer of the layered catalyst composite of the invention is to prepare a mixture of a solution of a platinum compound and at least one finely divided, high surface area, refractory metal oxide support, e.g., gamma alumina, which is sufficiently dry to absorb substantially all of the solution to form a slurry. Preferably, the slurry is acidic, having a pH of about 2 to less than 7. The pH of the slurry may be lowered by the addition of a minor amount of an inorganic or organic acid such as hydrochloric or nitric acid, preferably acetic acid, to the slurry. Thereafter, the $NO_x$ storage component, and optional transition metal components, stabilizers and/or promoters may be added to the slurry.

In a particularly preferred embodiment, the slurry is thereafter comminuted to result in substantially all of the solids having particle sizes of less than 20 microns, i.e., 1–15 microns, in an average diameter. The comminution may be accomplished in a ball mill or other similar equipment, and the solids content of the slurry may be, e.g., 20–60 wt. %, preferably 35–45 wt. %.

The top layer is thereafter prepared and deposited on the bottom layer of the calcined composite in a manner similar to that described above. After all coating operations have been completed, the composite is then again calcined by heating, e.g., at 400–600° C. for 1–3 hours.

The following nonlimiting examples shall serve to illustrate the various embodiments of the present invention.

Catalyst 1

Catalyst 1 is a dual layer catalyst composite that was prepared in the following manner: The substrate was cordierite. The bottom layer consisted of 75 g/ft$^3$ platinum, 0.42 g/in$^3$ BaO, 0.05 g/in$^3$ $ZrO_2$ and 1.83 g/in$^3$ of a support consisting of $TiO_2$-coated $Al_2O_3$. This support was prepared by the chemical vapor deposition of 10 wt. % of $TiO_2$ on the surface of the $Al_2O_3$. The support material was impregnated with a platinum-amine salt to achieve the desired loading. The powder was then milled, in the presence of water, such that 90% of the particles had a particle size below 10 micrometers (i.e., $d_{90}<10\mu$), thereby resulting in a high-solids slurry. During the milling process, barium acetate and zirconyl acetate dissolved in water were also added during the milling process.

The slurry of the bottom layer was then wash-coated on the cordierite substrate and the coated substrate was then dried at 110° C. for about one hour. Thereafter, the dried coated substrate was calcined by heating at 450° C. for one hour.

The top layer slurry was then wash-coated on the surface of the bottom layer, dried at 110° C. for about one hour and thereafter calcined by heating at 450° C. for one hour. The slurry for the top layer was prepared in the same manner as that described above for the bottom layer. The top layer consisted of 75 g/ft$^3$ platinum, 10 g/ft$^3$ rhodium, 0.08 g/in$^3$ BaO, 0.03 g/in$^3$ $ZrO_2$ and 1.20 g/in$^3$ of a support consisting of $TiO_2$-coated $Al_2O_3$. The platinum and rhodium components were sequentially impregnated on the support. The powder was then milled, in the presence of water, such that 90% of the particles had a particle size below 10 micrometers (i.e., $d_{90}<10\mu$), thereby resulting in a high-solids slurry. During the milling process, barium acetate and zirconyl acetate dissolved in water were also added during the milling process.

Catalyst 2

Catalyst 2 is a single-layer catalyst composite, i.e., only one layer was deposited on a cordierite substrate. This single layer was prepared in the same manner as described above for the layers for Catalyst 1. The single layer consisted of 150 g/ft$^3$ platinum, 0.40 g/in$^3$ BaO, 0.2 g/in$^3$ $Fe_2O_3$ and 2.4 g/in$^3$ of $Al_2O_3$ support. The composite was prepared by sequential impregnation of the support using iron nitrate, barium acetate and a platinum amine salt.

Lean Aging Conditions for Catalysts 1 and 2

Lean aging for Catalysts 1 and 2 was carried out by exposing the catalysts to a stream of air/steam (10% steam) at an inlet temperature of 700° C. for 4 hours with a gas hourly space velocity of 30,000 h$^{-1}$.

Lean/Rich Cyclic Aging Conditions for Catalysts 1 and 2

Lean/rich cyclic aging for Catalysts 1 and 2 was carried out with alternate lean and rich feeds at an inlet temperature of 700° C. for 4 hours with a gas hourly space velocity of 30,000 h$^{-1}$. The lean feed consisted of 500 ppm NO, 10% $H_2O$ and 80% $N_2$. The rich feed consisted of 4% CO, 0.5% $C_1$ (as $C_3H_6$), 1% $O_2$, 10% $H_2O$ and 84.5% $N_2$.

Catalyst Test Performance Protocols for Catalysts 1 and 2

The performance tests were carried out with an alternating lean and rich feed, typically with 50 seconds lean period and 5 seconds rich period using the lean and rich feeds described above. The catalysts were evaluated at temperatures of 200, 250, 300, 350 and 450° C. Once the performance stabilized at a given temperature, data were collected for a period of 10 minutes. The $NO_x$ concentrations downstream of the catalyst were compared with those upstream of the catalyst. The relative disappearance of $NO_x$ concentration, expressed in percentage, was calculated throughout the data collection period at the rate of 1/second. The instantaneous $NO_x$ conversions were then averaged and plotted against the catalyst inlet temperature, resulting in the graph in FIG. 1.

Catalyst 3

Catalyst 3 was prepared in the same manner as that of Catalyst 1 with the exception that the support was gamma-alumina rather than titanium dioxide coated on alumina.

Catalyst 4

Catalyst 4 was prepared in the following manner. The substrate was cordierite. The bottom layer, deposited on the cordierite, consisted of 75 g/ft$^3$ platinum, 0.42 g/in$^3$ BaO, 0.13 g/in$^3$ $Fe_2O_3$, 1 g/in$^3$ of $Al_2O_3$ support and 0.05 g/in$^3$ $ZrO_2$. The alumina support was first impregnated with an aqueous solution of iron nitrate followed by calcination at 450° C. for 1 hour. The resultant powder was then impregnated with an aqueous solution of barium acetate to achieve 0.27 g/in$^3$ BaO, followed by another calcination at 450° C. for 1 hour. The resultant powder was then impregnated with a platinum amine salt to achieve incipient wetness. The powder was then milled, in the presence of water, such that 90% of the particles had a particle size below 10 micrometers (i.e., $d_{90}<10\mu$), thereby resulting in a high-solids slurry. During the milling process, zirconyl acetate dissolved in water was added during the milling process. The resultant slurry was then coated onto the cordierite and thereafter the coated cordierite was then post-dipped in a barium acetate solution to achieve additional 0.15 g/in$^3$ BaO. The resultant cordierite was then dried at 110° C. for about one hour. Thereafter, the dried coated substrate was calcined by heating at 450° C. for one hour.

The top layer for Catalyst 4 consisted of 65 g/ft$^3$ platinum, 10 g/ft$^3$ rhodium, 0.08 g/in$^3$ BaO, 0.03 g/in$^3$ $ZrO_2$ and 0.20 g/in$^3$ of a support consisting of $Al_2O_3$. The process for preparing the top layer and the coating thereof on the bottom layer is identical to that described above in respect to Catalyst 1.

Catalyst 5

This layered catalyst composite was identical to Catalyst 4, except that the support for the top layer consisted of $TiO_2$ coated on $Al_2O_3$ rather than $Al_2O_3$.

Catalyst 6

This layered catalyst composite was identical to Catalyst 5, except that the support for both the bottom and top layers consisted of $TiO_2$ coated on $Al_2O_3$.

Catalyst 7

The process for preparing this catalyst composite was identical to that employed for the preparation of Catalyst 3.

The bottom layer consisted of 65 g/ft$^3$ platinum, 0.35 g/in$^3$ BaO, 0.05 g/in$^3$ $ZrO_2$ and 1.55 g/in$^3$ of a support consisting of $Al_2O_3$. The top layer that was coated onto the bottom layer consisted of 75 g/ft$^3$ platinum, 10 g/ft$^3$ rhodium, 0.12 g/in$^3$ BaO, 0.05 g/in$^3$ $ZrO_2$ and 1.5 g/in$^3$ of a support consisting of $Al_2O_3$.

Evaluation of Catalysts 1–7

Figure 2:
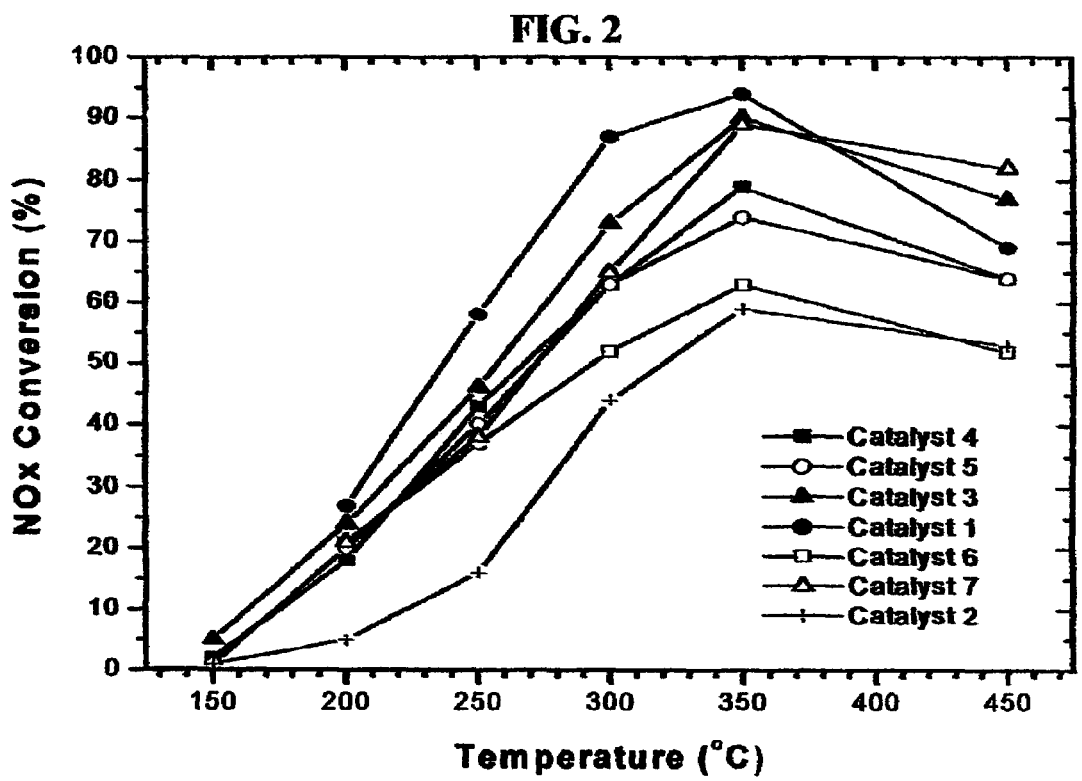
FIG. 2 is a graph that illustrates the $NO_x$ performance of Catalysts 1–7.

Catalysts 1–7 were exposed to lean/rich cyclic thermal treatment at 700° C. as described above under Lean/Rich Cyclic Aging Conditions. The performance of each catalyst was then determined by the method described above under Catalyst Test Performance Protocols for Catalysts 1 and 2. The result of the comparison of Catalysts 1–7 is set forth in the graph in FIG. 2.

Sulfation and Desulfation of Catalyst 1

Sulfation tests were conducted on Catalyst 1 at a constant reaction temperature of 300° C. with 10 ppm $SO_2$ in both lean and rich feeds. The gas concentrations of the other components and the lean/rich timing were identical to those set forth above in the sections entitled Lean/Rich Cyclic Aging Conditions for Catalysts 1 and 2 and Catalyst Test Performance Protocols for Catalysts 1 and 2.

Figure 3:
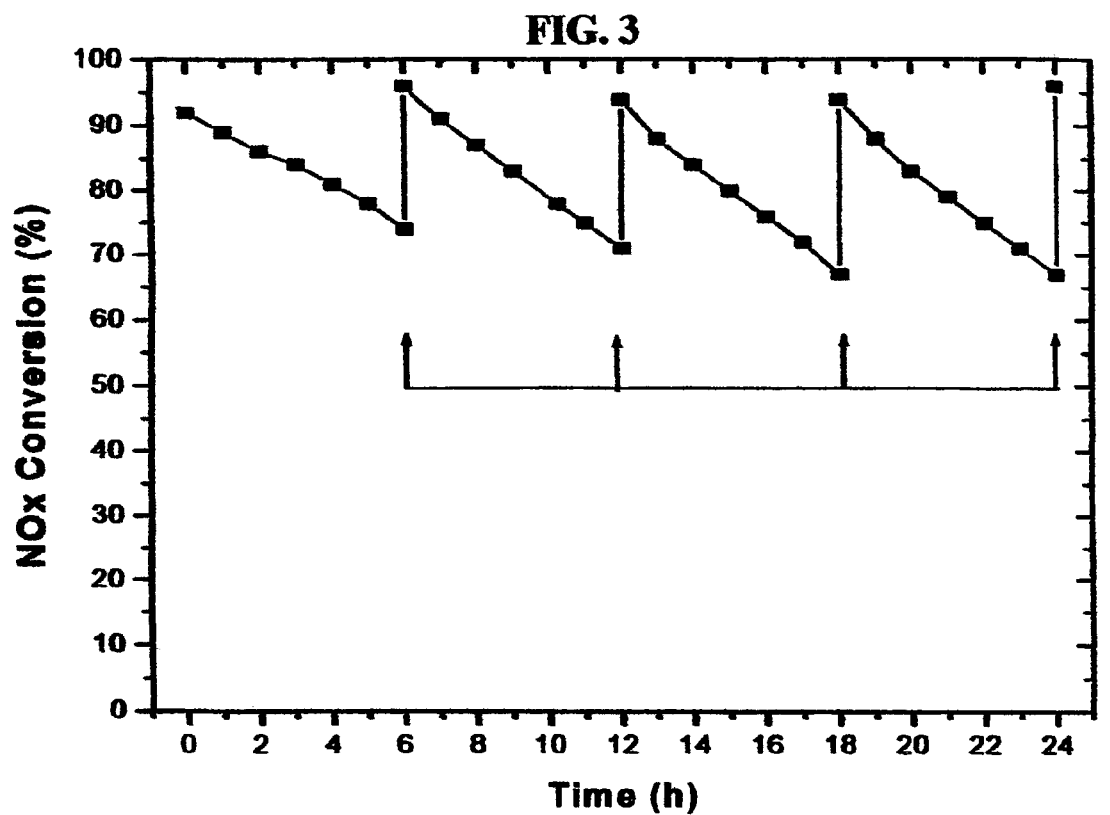
FIG. 3 is a graph that illustrates the recovery of $NO_x$ performance for Catalyst 1 after it has been poisoned with $SO_2$.

The data were collected every hour and each data collection period lasted for 10 minutes. Only the averaged $NO_x$ conversions at a given time are shown in the graph in FIG. 3. Each sulfation run lasted for 6 hours and at the end of each sulfation run, a desulfation process was initiated. The desulfation process involved heating the gas to 650° C. in a nitrogen stream. At the targeted desulfation temperature (650° C.), a special lean/rich (5 second lean/15 second rich) alternating stream was turned on. Catalyst 1 was exposed to this alternating stream for 5 minutes, thereby completing the desulfation process. FIG. 3 shows four consecutive sulfation and desulfation runs. As may be seen from the graph in FIG. 3, the $NO_x$ conversion had recovered to its original level.

Catalyst 8

The substrate consisted of cordierite. The bottom layer consisted of 75 g/ft$^3$ platinum, 0.42 g/in$^3$ BaO, 0.05 g/in$^3$ $ZrO_2$ and 1.83 g/in$^3$ of a support consisting of $CeO_2$-coated $Al_2O_3$, This support was prepared by the incipient wetness technique to allow 10 wt. % of $CeO_2$ on the surface of the $Al_2O_3$. The support material was impregnated with a platinum-amine salt to achieve the desired loading. The powder was then milled, in the presence of water, such that 90% of the particles had a particle size below 10 micrometers (i.e., $d_{90}<10\mu$), thereby resulting in a high-solids slurry. During the milling process, barium acetate and zirconyl acetate dissolved in water were also added during the milling process.

The slurry of the bottom layer was then wash-coated on the cordierite substrate and the coated substrate was then dried at 110° C. for about one hour. Thereafter, the dried coated substrate was calcined by heating in a stream of flowing air at 450° C. for one hour.

The top layer slurry was then wash-coated on the surface of the bottom layer, dried at 110° C. for about one hour and thereafter calcined by heating at 450° C. for one hour. The slurry for the top layer was prepared in the same manner as that described above for the bottom layer. The top layer consisted of 75 g/ft$^3$ platinum, 10 g/ft$^3$ rhodium, 0.08 g/in$^3$ BaO, 0.03 g/in$^3$ $ZrO_2$ and 1.20 g/in$^3$ of a support consisting of $CeO_2$-coated $Al_2O_3$ (10 wt. % $CeO_2$). The platinum and rhodium components were sequentially impregnated on the support material. The powder was then milled, in the presence of water, such that 90% of the particles had a particle size below 10 micrometers (i.e., $d_{90}<10\mu$), thereby resulting in a high-solids slurry. During the milling process, barium acetate and zirconyl acetate dissolved in water were also added during the milling process.

Sulfation and Desulfation of Catalyst 8

Figure 4:
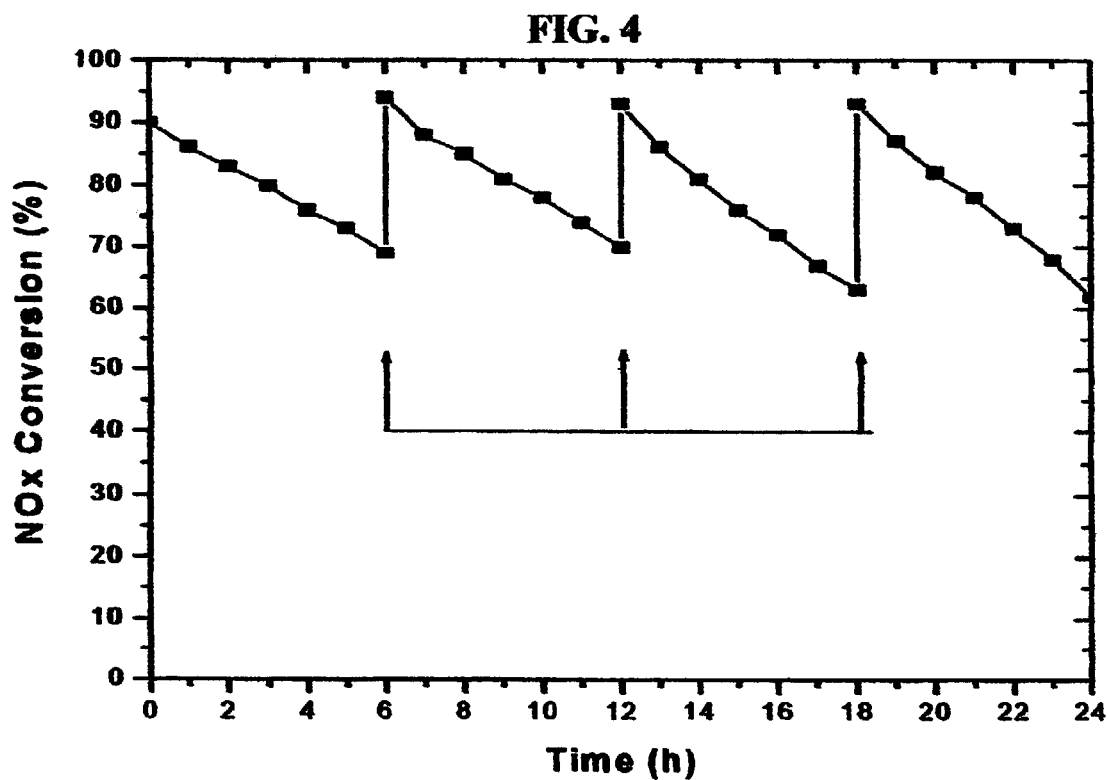
FIG. 4 is a graph that illustrates the recovery of $NO_x$ performance for Catalyst 8 after it has been poisoned with $SO_2$.

Catalyst 8 was sulfated and desulfated in the same manner as that described above in respect to the sulfation and desulfation of Catalyst 1, except that the desulfation was carried out at 600° C. rather than 650° C. FIG. 4 shows four consecutive sulfation and desulfation runs. As may be seen from the graph in FIG. 4, the $NO_x$ conversion for Catalyst 8 had recovered to its original level.

What is claimed is:

1. A layered catalyst composite for controlling vehicular exhaust emissions comprising:
   (a) a substrate;
   (b) at least one bottom layer having a bottom surface and a top surface wherein the bottom surface is adjacent to, and in contact with, the substrate, said bottom layer comprising a support upon which is deposited: (i) a precious metal component which consists of a platinum metal component and (ii) at least one $NO_x$ storage component present in the amount of about 0.3 to about 1.5 $g/in^3$; and
   (c) at least one top layer having a bottom surface and a top surface wherein the bottom surface is adjacent to, and in contact with, the top surface of the bottom layer, said top layer comprising a support upon which is deposited (i) at least one precious metal which consists of a component selected from platinum and rhodium metal components, and (ii) at least one $NO_x$ storage component present in the amount of 0.0 to less than about 0.3 $g/in^3$.

2. The catalyst composite of claim 1 wherein the substrate comprises a ceramic or metal having a honeycomb structure.

3. The catalyst composite of claim 2 wherein the ceramic is selected from the group consisting of cordierite, cordierite-α alumina, silicon nitride, zircon mullite, spodumene, alumina-silica magnesia, zircon silicate, sillimanite, magnesium silicates, zircon, petalite, α-alumina and an aluminosilicate.

4. The catalyst composite of claim 3 wherein the ceramic comprises cordierite.

5. The catalyst composite of claim 2 wherein the metal is selected from the group consisting of titanium and stainless steel.

6. The catalyst composite of claim 1 wherein the support present in the bottom layer comprises a high surface area refractory metal oxide.

7. The catalyst composite of claim 6 wherein the refractory metal oxide is selected from the group consisting of alumina, titania, zirconia; mixtures of alumina with one or more of titania, zirconia and ceria; ceria coated on alumina; and titania coated on alumina.

8. The catalyst composite of claim 7 wherein the metal oxide comprises gamma-alumina.

9. The catalyst composite of claim 7 wherein the metal oxide comprises ceria coated on alumina.

10. The catalyst composite of claim 7 wherein the metal oxide comprises titania coated on alumina.

11. The catalyst composite of claim 1 wherein the support is present in the bottom layer in the amount of about 0.5 to about 3.0 $g/in^3$.

12. The catalyst composite of claim 1 wherein the support present in the top layer comprises a high surface area refractory metal oxide.

13. The catalyst composite of claim 10 wherein the refractory metal oxide is selected from the group consisting of alumina, titania, zirconia; mixtures of alumina with one or more of titania, zirconia and ceria; ceria coated on alumina; and titania coated on alumina.

14. The catalyst composite of claim 12 wherein the metal oxide comprises gamma-alumina.

15. The catalyst composite of claim 12 wherein the metal oxide comprises ceria coated on alumina.

16. The catalyst composite of claim 12 wherein the metal oxide comprises titania coated on alumina.

17. The catalyst composite of claim 1 wherein the support is present in the top layer in the amount of about 0.5 to about 3.0 $g/in^3$.

18. The catalyst composite of claim 1 wherein the precious metal components present in the top layer consist of the platinum and rhodium metal components.

19. The catalyst composite of claim 1 wherein the precious metal component consists of the platinum metal component.

20. The catalyst composite of claim 1 wherein the precious metal is present in the bottom layer in a loading of about 10 to about 120 $g/ft^3$.

21. The catalyst composite of claim 1 wherein the precious metal is present in the top layer in a loading of about 10 to about 120 $g/ft^3$.

22. The catalyst composite of claim 1 wherein the bottom layer further comprises: (a) a transition metal component wherein the transition metal is selected from the group consisting of zirconium, cerium, manganese, iron and titanium; or (b) a rare earth metal component wherein the rare earth metal is selected from the group consisting of lanthanum, praseodymium, yttrium and zirconium; or (c) mixtures of one or more transition metal components and one or more rare earth metal components 23. The catalyst composite of claim 22 wherein the transition metal components and/or the rare earth metal components are present in the bottom layer in an amount of about 0.01 to about 0.5 $g/in^3$.

24. The catalyst composite of claim 1 wherein the top layer further comprises: (a) a transition metal component wherein the transition metal is selected from the group consisting of zirconium, cerium, manganese, iron and titanium; or (b) a rare earth metal component wherein the rare earth metal is selected from the group consisting of lanthanum, praseodymium, yttrium, zirconium; or (c) mixtures of one or more transition metal components and/or one or more rare earth metal components 25. The catalyst composite of claim 24 wherein the transition metal components and/or the rare earth metal components are present in the top layer in an amount of about 0.01 to about 0.5 $g/in^3$.

26. The catalyst composite of claim 1 wherein the $NO_x$ storage component in the bottom layer comprises a basic oxygenated compound of an alkali metal or an alkaline earth metal.

27. The catalyst composite of claim 26 wherein the alkali metal is selected from the group consisting of lithium, sodium, potassium and cesium.

28. The catalyst composite of claim 27 wherein the alkali metal comprises potassium.

29. The catalyst composite of claim 28 wherein the alkaline earth metal is selected from the group consisting of magnesium, calcium, strontium and barium.

30. The catalyst composite of claim 29 wherein the alkaline earth metal comprises barium.

31. The catalyst composite of claim 1 wherein the $NO_x$ storage component in the top layer comprises a basic oxygenated compound of an alkali metal or an alkaline earth metal.

32. The catalyst composite of claim 31 wherein the alkali metal is selected from the group consisting of lithium, sodium, potassium and cesium.

33. The catalyst composite of claim 32 wherein the alkali metal comprises potassium.

34. The catalyst composite of claim 31 wherein the alkaline earth metal is selected from the group consisting of magnesium, calcium, strontium and barium.

35. The catalyst composite of claim 34 wherein the alkaline earth metal comprises barium.

* * * * *